US010980083B2

(12) United States Patent
Hao et al.

(10) Patent No.: US 10,980,083 B2
(45) Date of Patent: Apr. 13, 2021

(54) MANAGEMENT OF A COMBINED SMART-MIC AND RADIO SYSTEM

(71) Applicant: TAIT INTERNATIONAL LIMITED, Christchurch (NZ)

(72) Inventors: Anakin Hao, Christchurch (NZ); Tong-Wook Shinn, Christchurch (NZ); Bowei Yu, Christchurch (NZ); Aritra Das, Christchurch (NZ)

(73) Assignee: TAIT INTERNATIONAL LIMITED, Christchurch (NZ)

( * ) Notice: Subject to any disclaimer, the term of this patent is extended or adjusted under 35 U.S.C. 154(b) by 0 days.

(21) Appl. No.: 16/683,315

(22) Filed: Nov. 14, 2019

(65) Prior Publication Data

US 2020/0154512 A1  May 14, 2020

Related U.S. Application Data

(60) Provisional application No. 62/767,041, filed on Nov. 14, 2018.

(51) Int. Cl.
*H04W 76/45* (2018.01)
*H04W 4/10* (2009.01)
*H04W 88/06* (2009.01)

(52) U.S. Cl.
CPC .......... *H04W 76/45* (2018.02); *H04W 4/10* (2013.01); *H04W 88/06* (2013.01)

(58) Field of Classification Search
CPC ........ H04W 76/45; H04W 88/06; H04W 4/10
USPC ................................................. 455/509, 516
See application file for complete search history.

(56) References Cited

U.S. PATENT DOCUMENTS

| 7,148,187 | B1 | 12/2006 | Simon et al. | |
|---|---|---|---|---|
| 7,751,348 | B2 * | 7/2010 | Shaffer | H04L 65/4061 370/260 |
| 8,135,001 | B1 * | 3/2012 | Barreiro | H04L 65/4061 370/352 |
| 8,145,249 | B2 * | 3/2012 | Shaffer | H04L 65/605 455/518 |
| 10,015,658 | B1 * | 7/2018 | Alfaro | H04W 52/0296 |
| 10,341,839 | B2 * | 7/2019 | Alfaro | H04M 1/72538 |
| 2006/0154683 | A1 * | 7/2006 | Umezawa | H04W 76/45 455/518 |
| 2007/0104121 | A1 * | 5/2007 | Shaffer | H04L 65/4038 370/276 |
| 2007/0105578 | A1 * | 5/2007 | Shaffer | H04W 84/08 455/518 |
| 2007/0105579 | A1 * | 5/2007 | Shaffer | H04L 65/605 455/519 |
| 2014/0066118 | A1 * | 3/2014 | Pai | H04W 76/45 455/518 |
| 2016/0050547 | A1 * | 2/2016 | Wong | H04M 3/568 455/518 |
| 2016/0143075 | A1 * | 5/2016 | Tucker | H04W 76/45 370/329 |

(Continued)

*Primary Examiner* — Hai V Nguyen
(74) *Attorney, Agent, or Firm* — Ladas & Parry LLP; Malcolm J. MacDonald

(57) ABSTRACT

A smart mic may be combined with an LMR radio terminal for user communication. An outgoing user communication by either the LMR terminal or the smart mic causes a corresponding incoming communication received respectively at the smart mic or the LMR terminal to be suppressed in various ways. This prevents audio interference for the user.

15 Claims, 21 Drawing Sheets

(56) References Cited

U.S. PATENT DOCUMENTS

Figure 1:
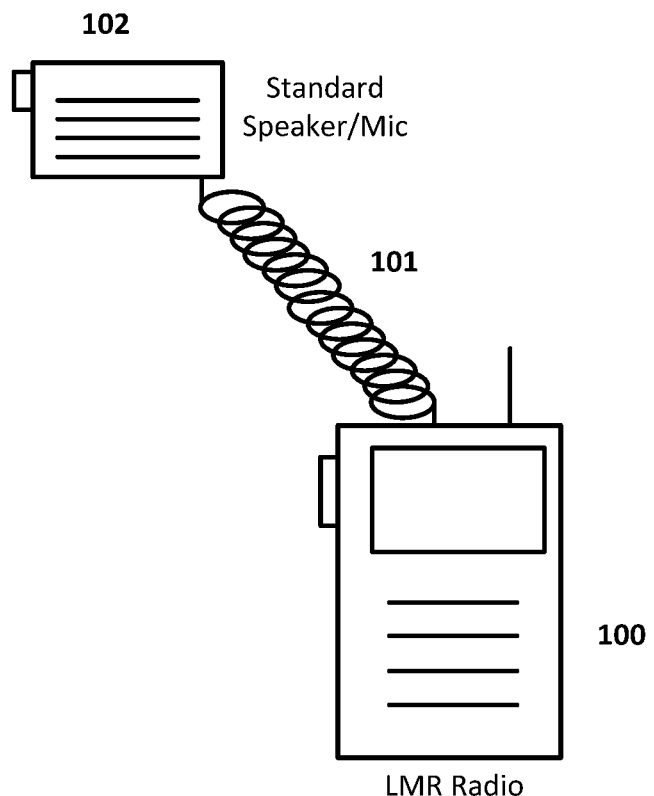

| | | | | |
|---|---|---|---|---|
| 2019/0141508 A1* | 5/2019 | Alfaro | ............... | H04W 40/36 |
| 2019/0387368 A1* | 12/2019 | Sachs | ............... | H04M 9/082 |
| 2020/0044675 A1* | 2/2020 | McIndoe | ............... | H04R 3/00 |
| 2020/0084014 A1* | 3/2020 | Shinn | ............... | H04W 4/10 |

* cited by examiner

MANAGEMENT OF A COMBINED SMART-MIC AND RADIO SYSTEM

This application claims the benefit of U.S. Provisional Application No. 62/767,041, filed Nov. 14, 2018.

FIELD OF THE INVENTION

This invention relates to operation of a user communication system having a combined cellular communication device and LMR radio device. More particularly this invention relates to an apparatus integrating an LMR system to a cellular system such that transmission from a radio terminal or smart mic over one communication path will not cause audio interference for the user via the other communication path. In addition, duplicate data transmissions are detected and managed.

BACKGROUND TO THE INVENTION

Land Mobile Radio (LMR) systems traditionally support PTT operation in half duplex. This means that a radio terminal or smart mic can either transmit or receive but not do so simultaneously. PTT solutions that operate over Internet Protocol (IP) are commonly referred to as Voice Over IP (VOIP) solutions. Some VOIP solutions are implemented as half duplex. Other VOIP solutions are implemented in full duplex which means a radio terminal or smart mic can receive and transmit simultaneously.

LMR is a technology that supplies PTT voice service but operates over communication technology specifically optimized for voice. Examples of LMR technology include but are or not limited to P25 (APCO 25), Tetra, DMR (Digital Mobile Radio), or analogue LMR. LMR PTT voice service typically operates using an LMR server that forms a central controller to which all the LMR radios connect to for service. Generally LMR voice services are half duplex.

Push To Talk over Cellular (PTToC) solutions are used by professional users such as security guards for voice communication. The technology typically uses a PTToC server deployed either locally or on the cloud and multiple PTToC clients connect to the server for operations. Typically the PTToC clients operate on smart phones using the cellular network for communications and the voice service supplied is either half duplex or full duplex. More generally the technology is referred to as VOIP because the voice service can run over any suitable IP network such as Wi-Fi as well as cellular.

Today, professional users such as police, fire and ambulance tend to use a combination of LMR and PTToC technologies. Unique integration problems are created when LMR and PTToC technologies are combined.

If an audio transmission is initiated from a combined LMR/PTToC terminal over the PTToC path into a network then the same audio transmission will arrive at the originating terminal via the LMR path. This happens because the LMR server is connected to the PTToC server in the network via a gateway which means a call received on the LMR path maybe re-transmitted on the PTToC path and vice versa. In other words the user of a combined LMR/PTToC terminal will be able to hear themselves talking making the use of the terminal less practical.

Similarly if a data message is transmitted from a combined LMR/PTToC terminal over the PTToC path into a network then the same data message may arrive at the original terminal via the LMR path. This happens because the LMR server is connected to the PTToC server via a gateway which means a data message received over PTToC may be re-transmitted over LMR. If a data packet transmission originates on the LMR path from the combined LMR/PTToC terminal then the PTToC side of the combined terminal may receive the message and vice versa.

SUMMARY OF THE INVENTION

An object of the invention is to provide a solution for a combined LMR/PTToC user system which prevents audio interference caused by a transmission over one communication bearer being simultaneously received and produced at a speaker via another communication bearer.

In one aspect the invention resides in a combined LMR/cellular system for user communication including: an LMR terminal and a smart mic; wherein an outgoing user communication by either the LMR terminal or the smart mic causes a corresponding incoming communication received respectively at the smart mic or the LMR terminal to be suppressed.

The incoming communication from either device may be suppressed by muting a call or ignoring a message, for example. Alternatively, suppression of an incoming communication from the smart mic may be achieved by causing the LMR terminal to enter a scan or hunt mode, or to change channel. The incoming communication may be assessed at the terminal or smart mic according to an ID of the smart mic or terminal respectively.

The bearer over which LMR is originating can be any type of LMR including but not limited to P25 (APCO 25), Tetra, DMR (Digital Mobile Radio), or analogue LMR. The description of the LMR network described here is a trunked P25 network however the approach of switching between full duplex and half duplex in the PTT core is valid irrespective of the type of LMR network being connected to either trunked or conventional. In general it is the source considered to be a half duplex source. Similarly the bearer over which a PTToC call or message is originating may be any type of cellular system such as LTE.

LIST OF FIGURES

Figure 2:
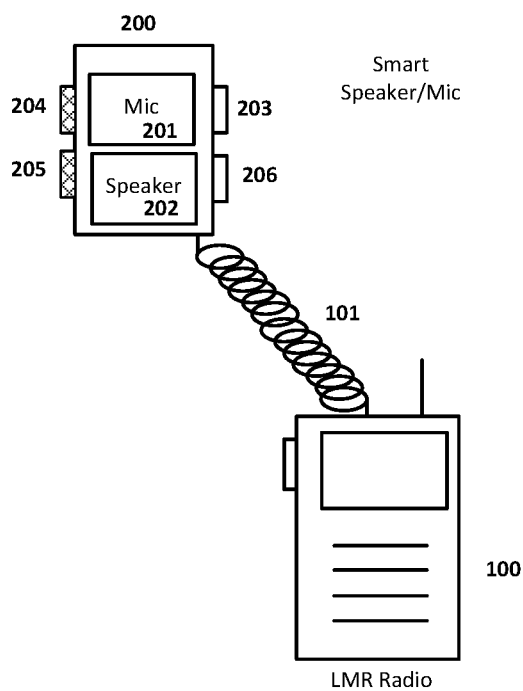
Figure 3:
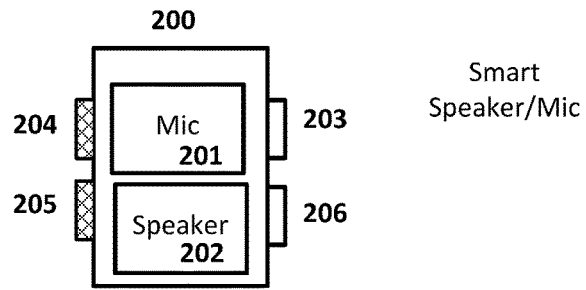
Figure 4:
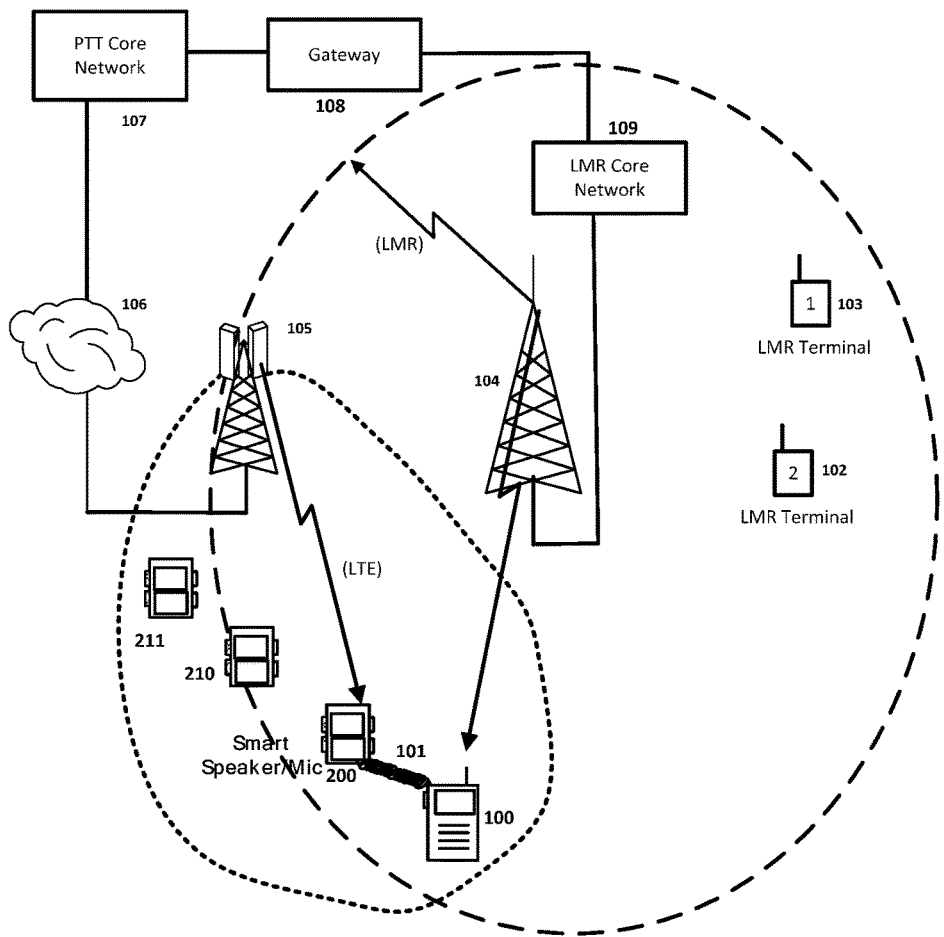
Figure 5:
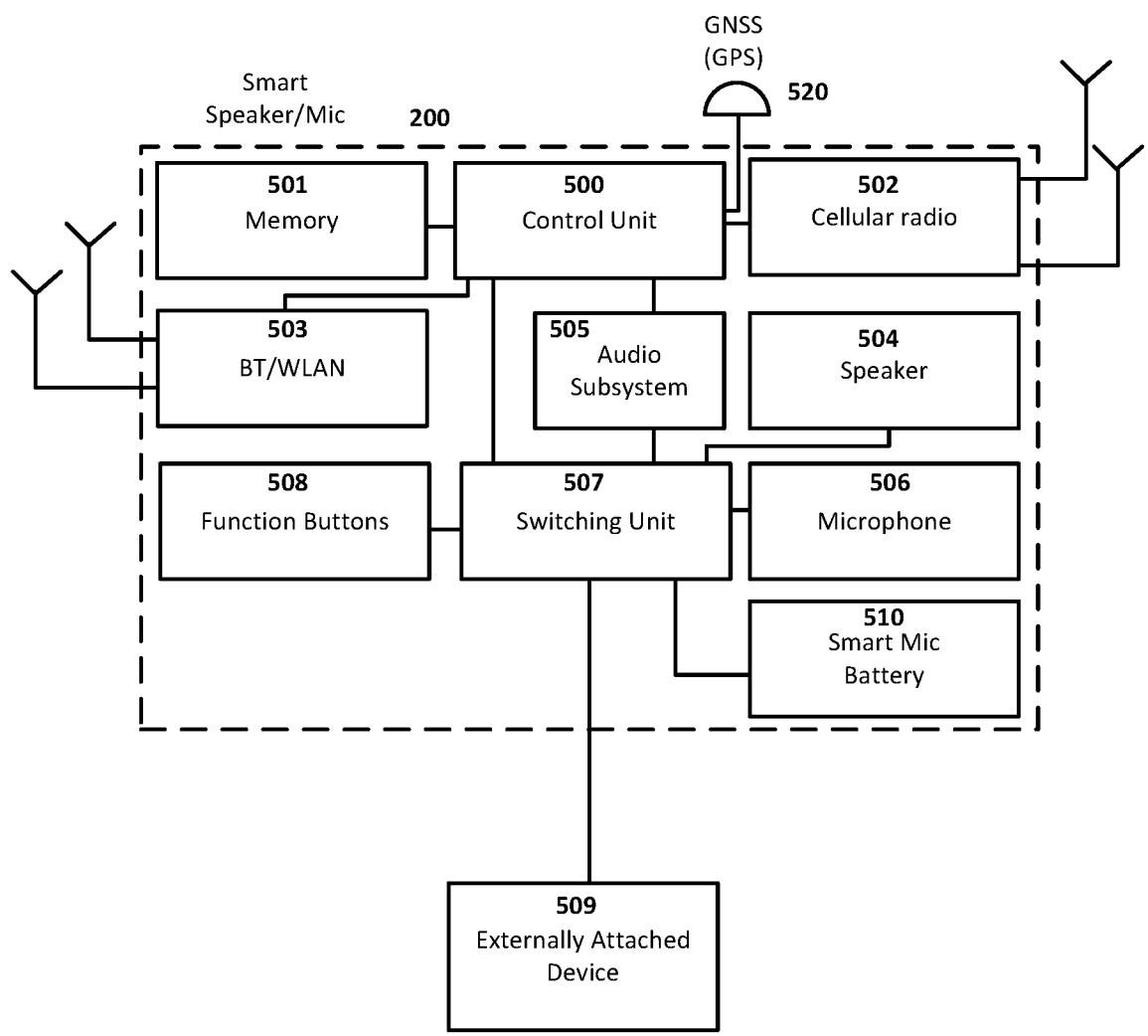
Figure 6:
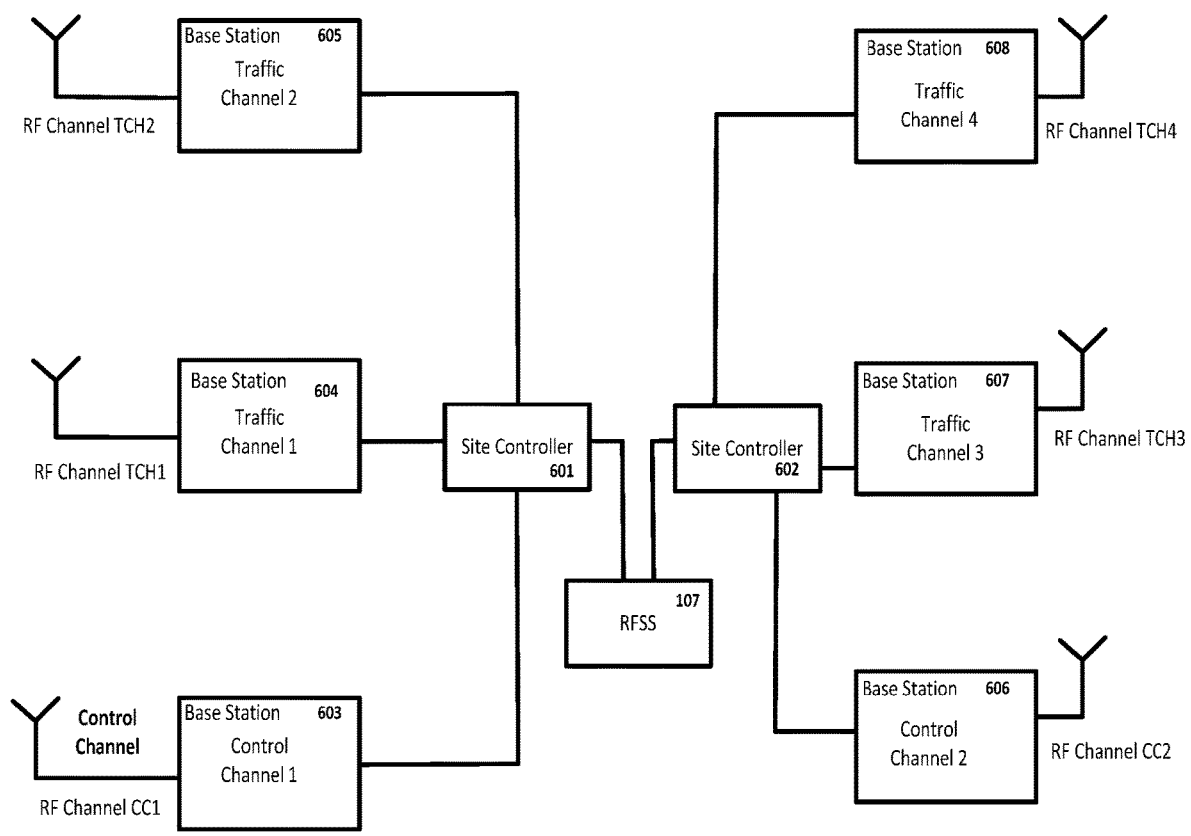
Figure 7:
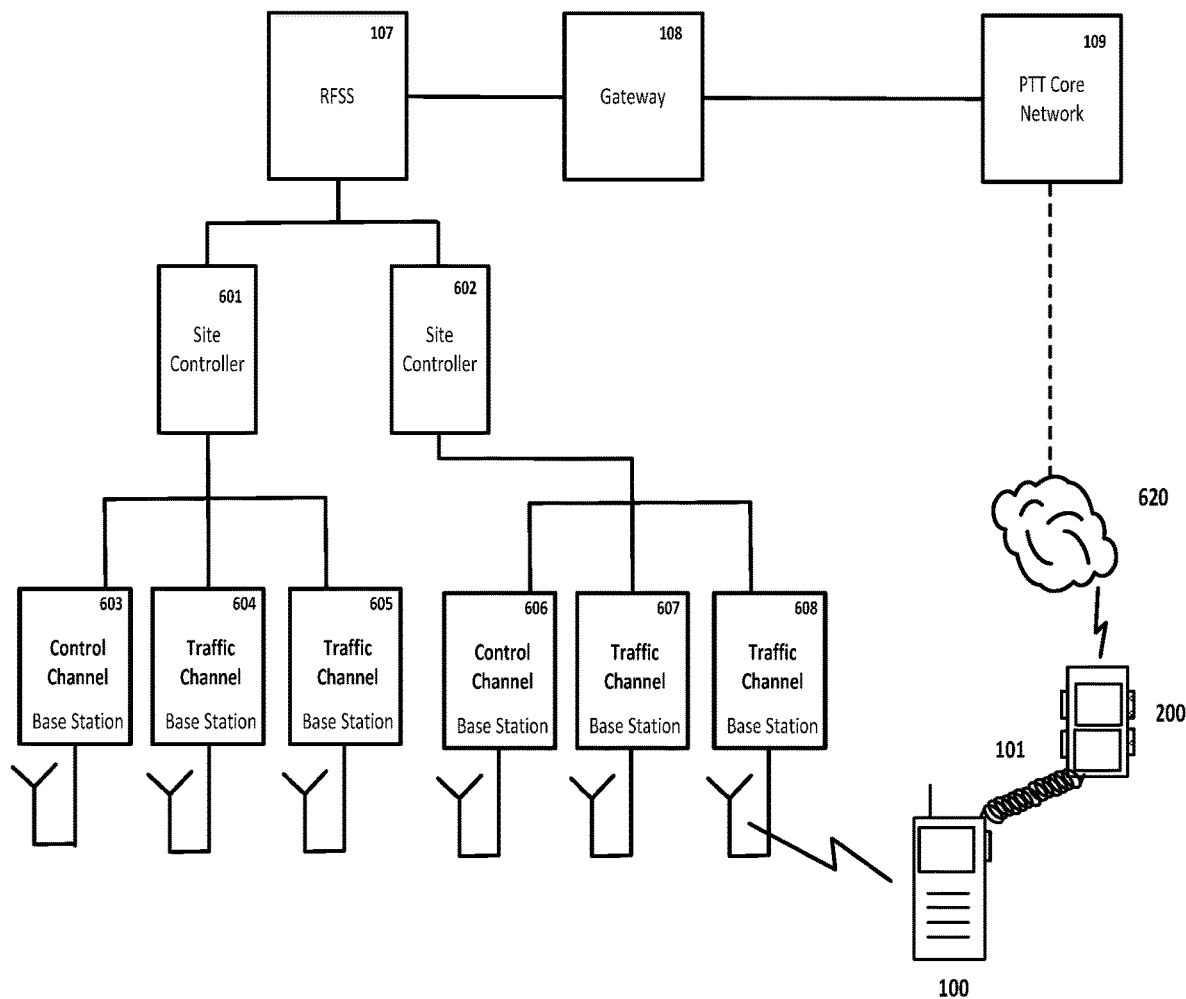
Figure 8:
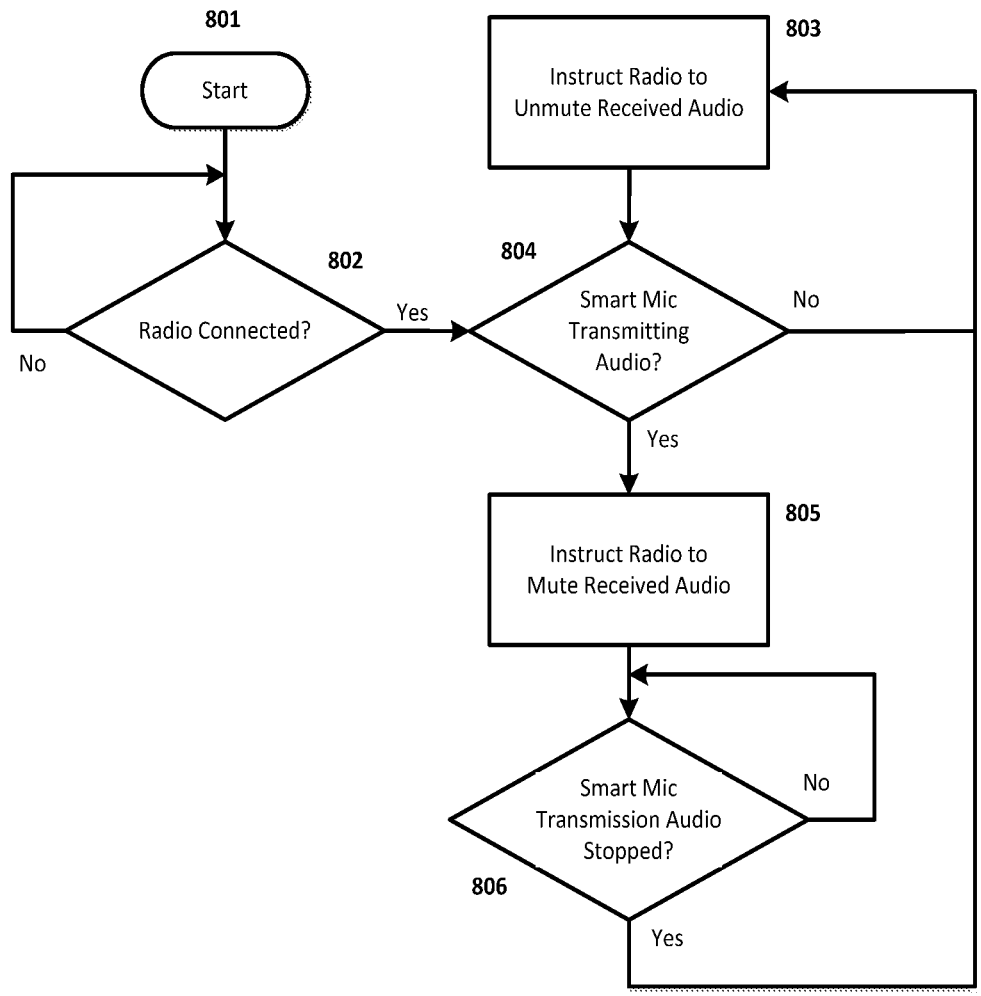
Figure 9:
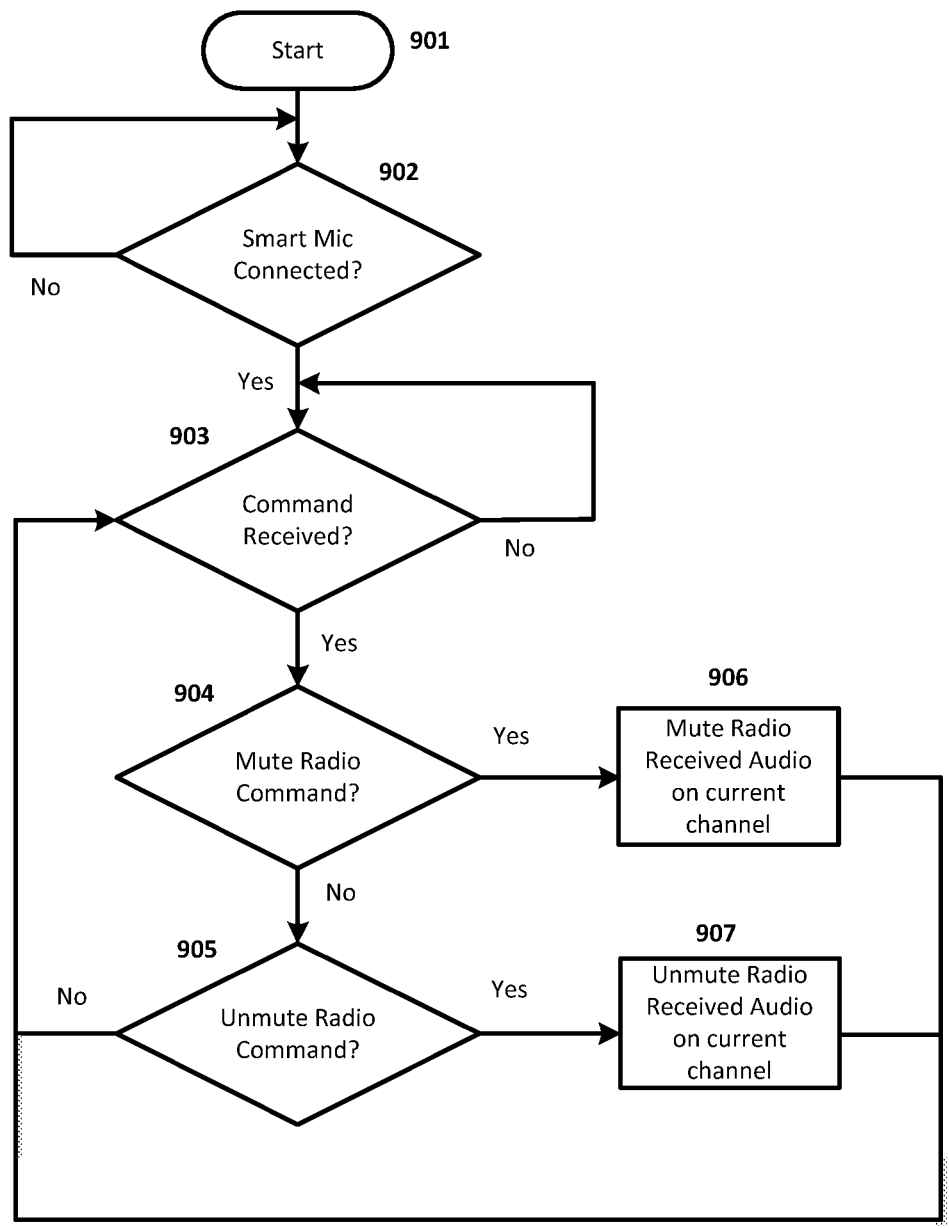
Figure 10:
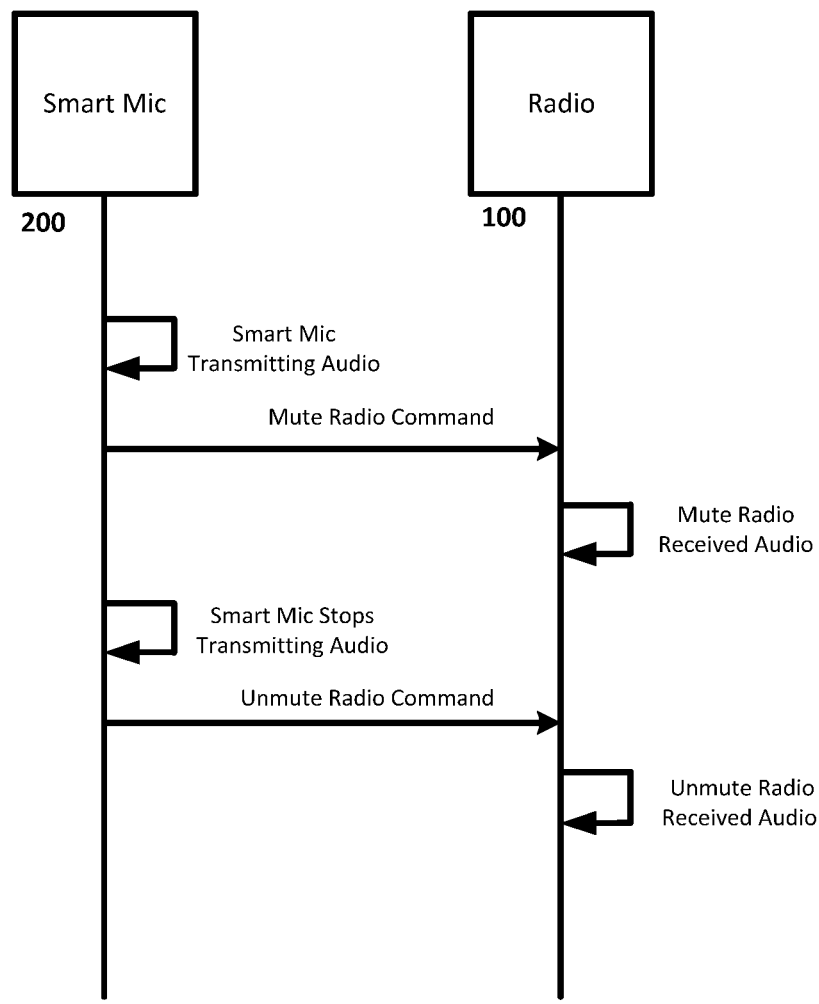
Figure 11:
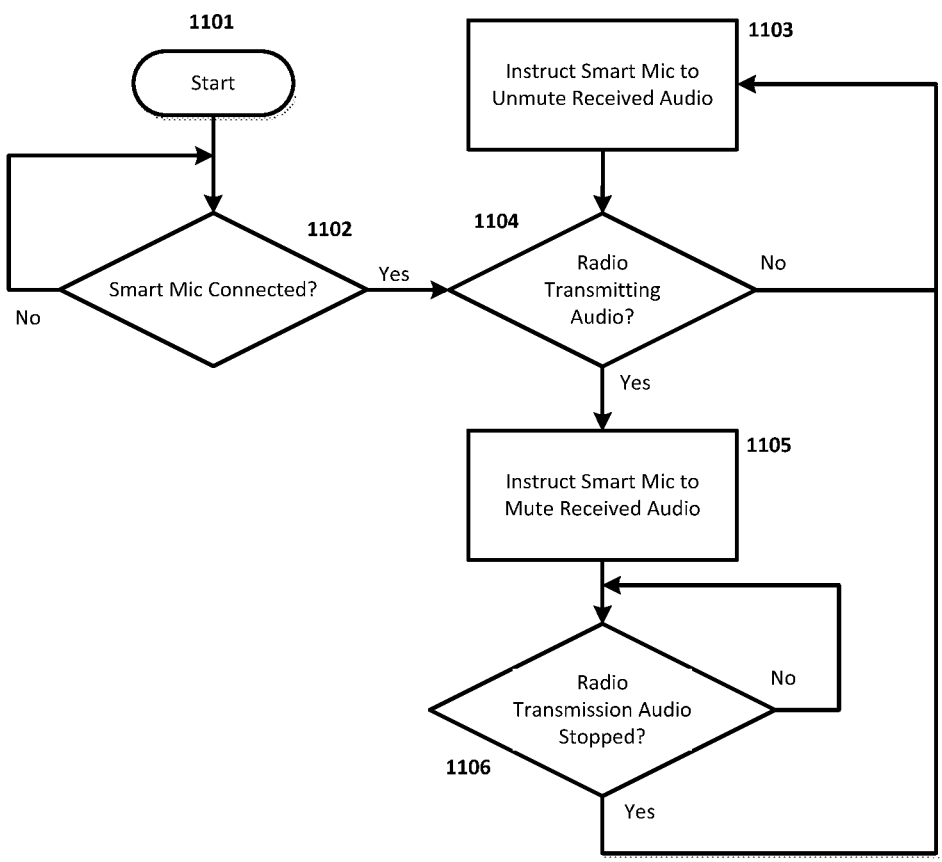
Figure 12:
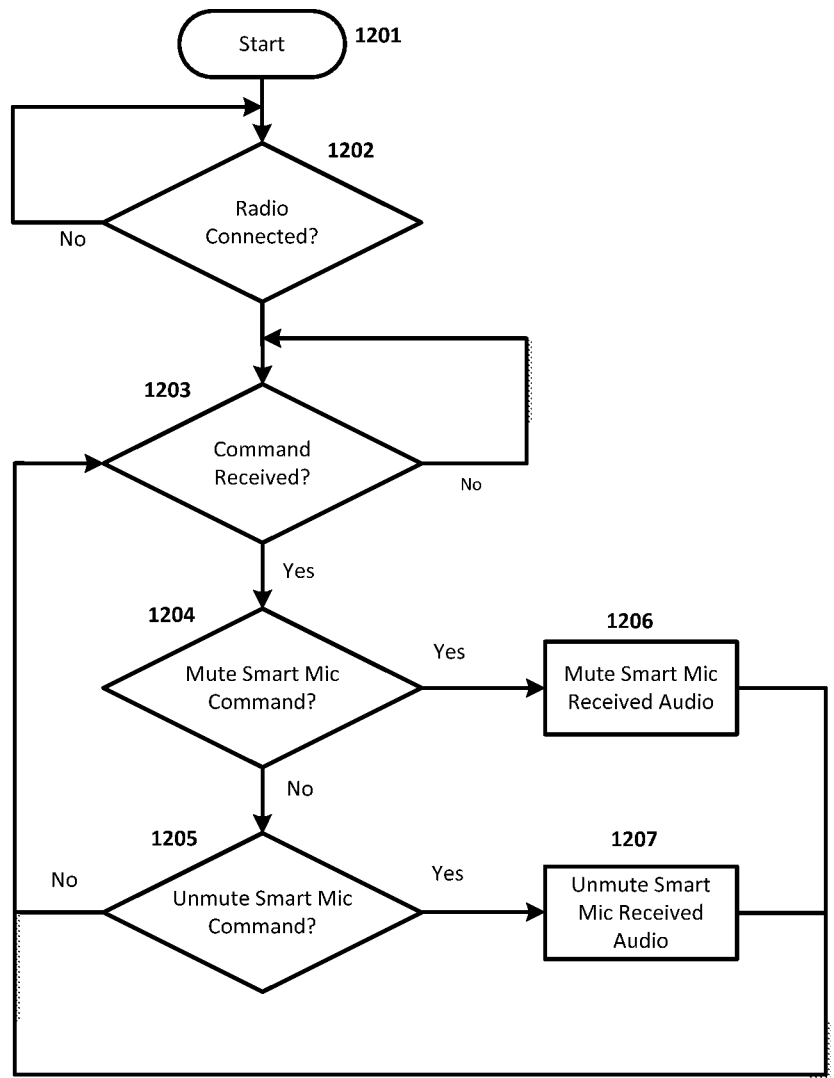
Figure 13:
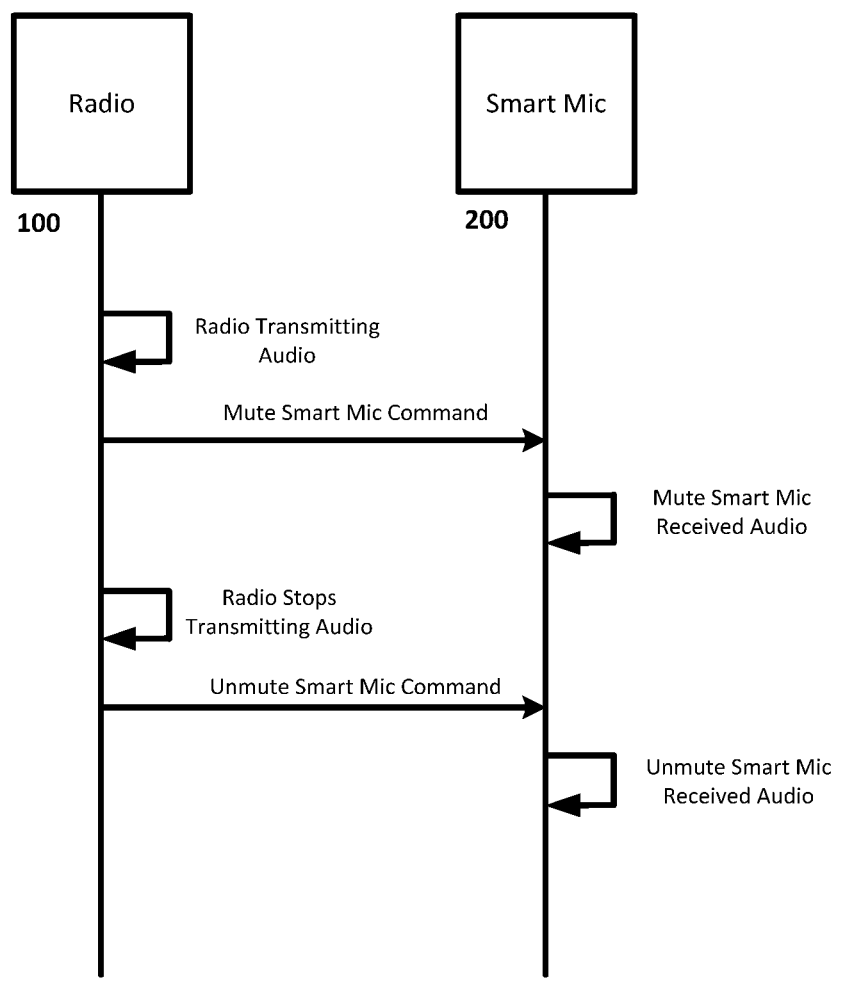
Figure 14:
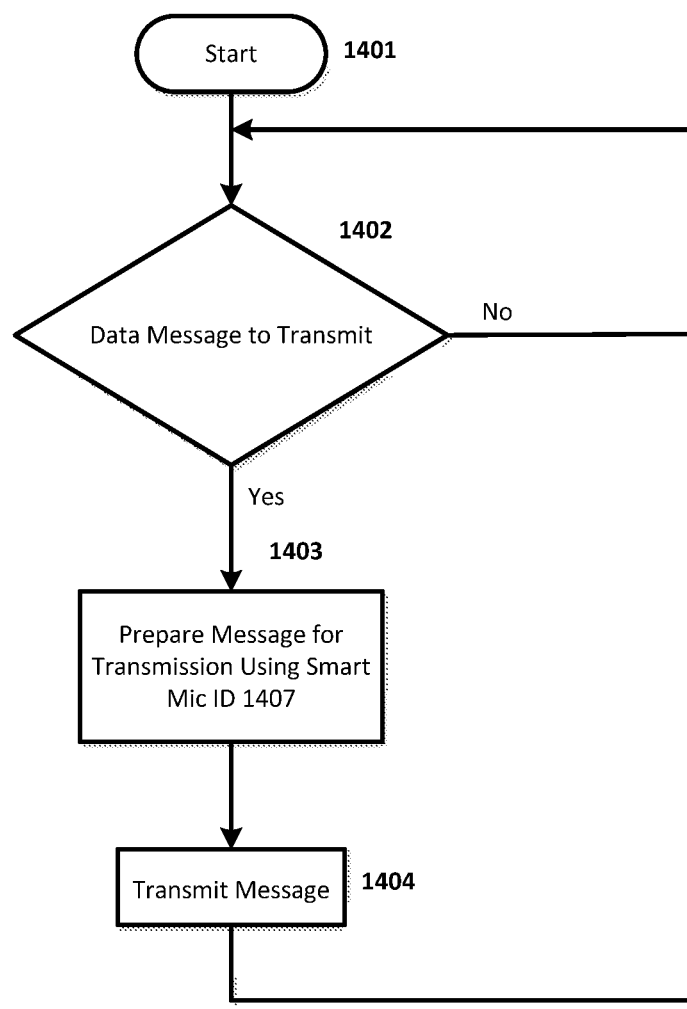
Figure 15:
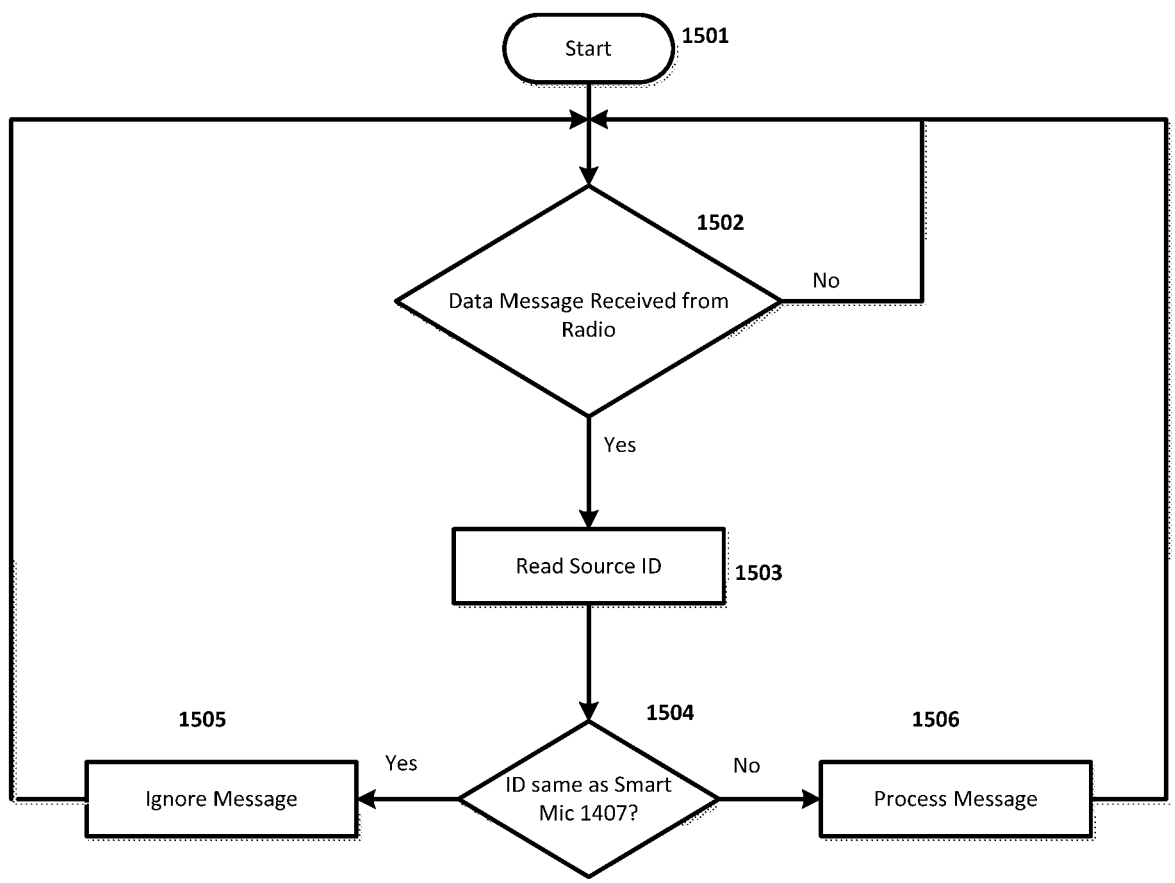
Figure 16:
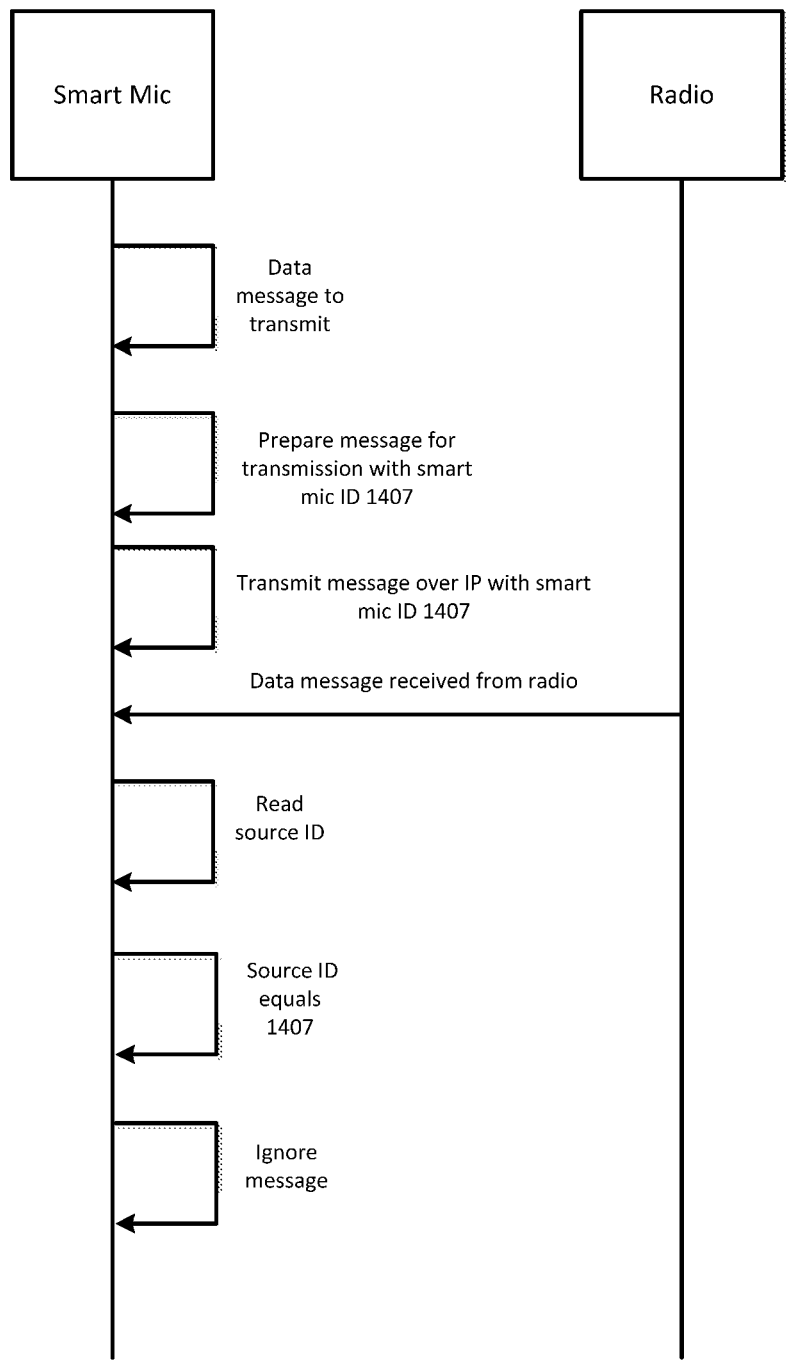
Figure 17:
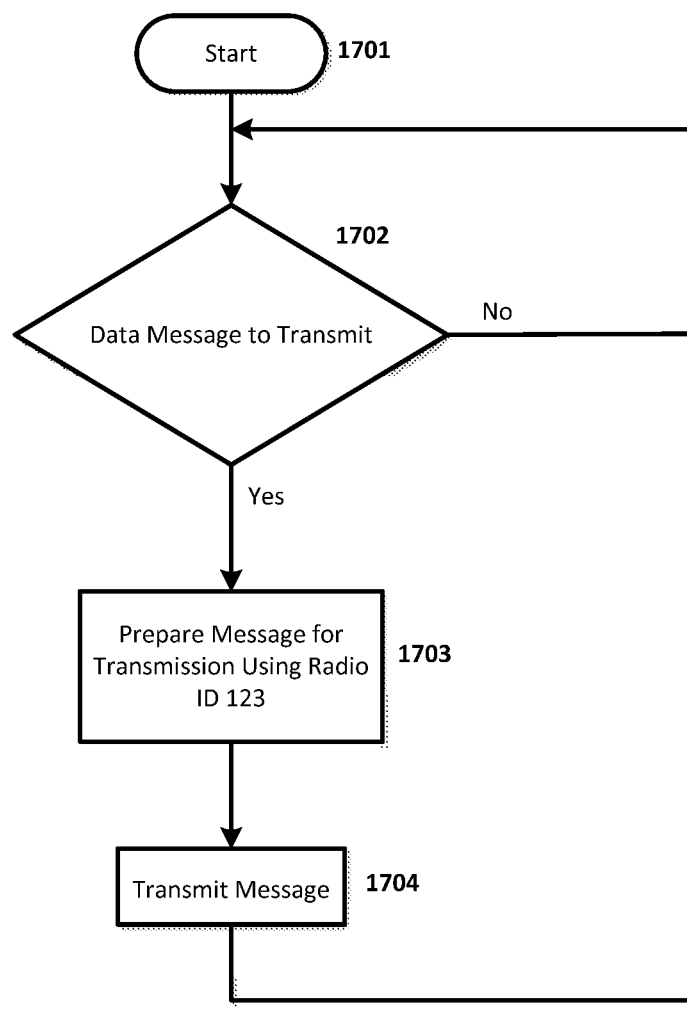
Figure 18:
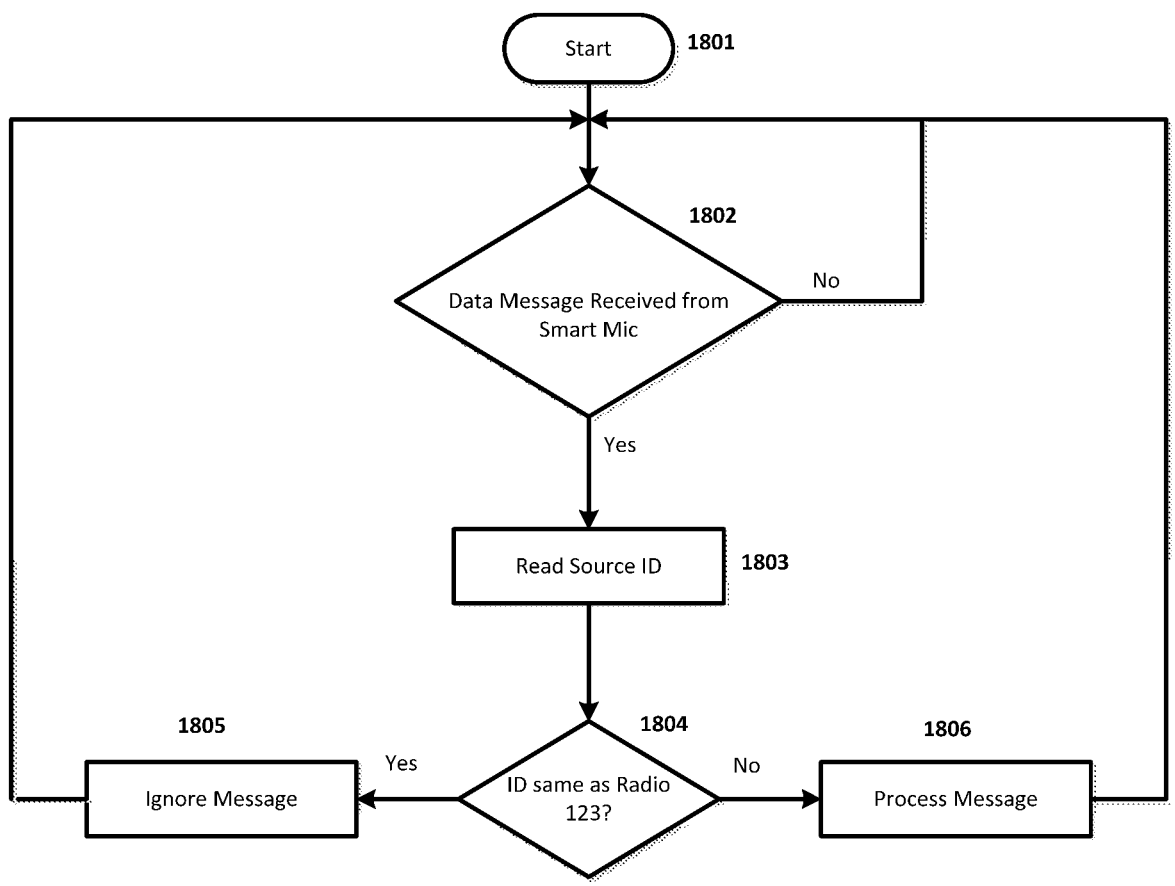
Figure 19:
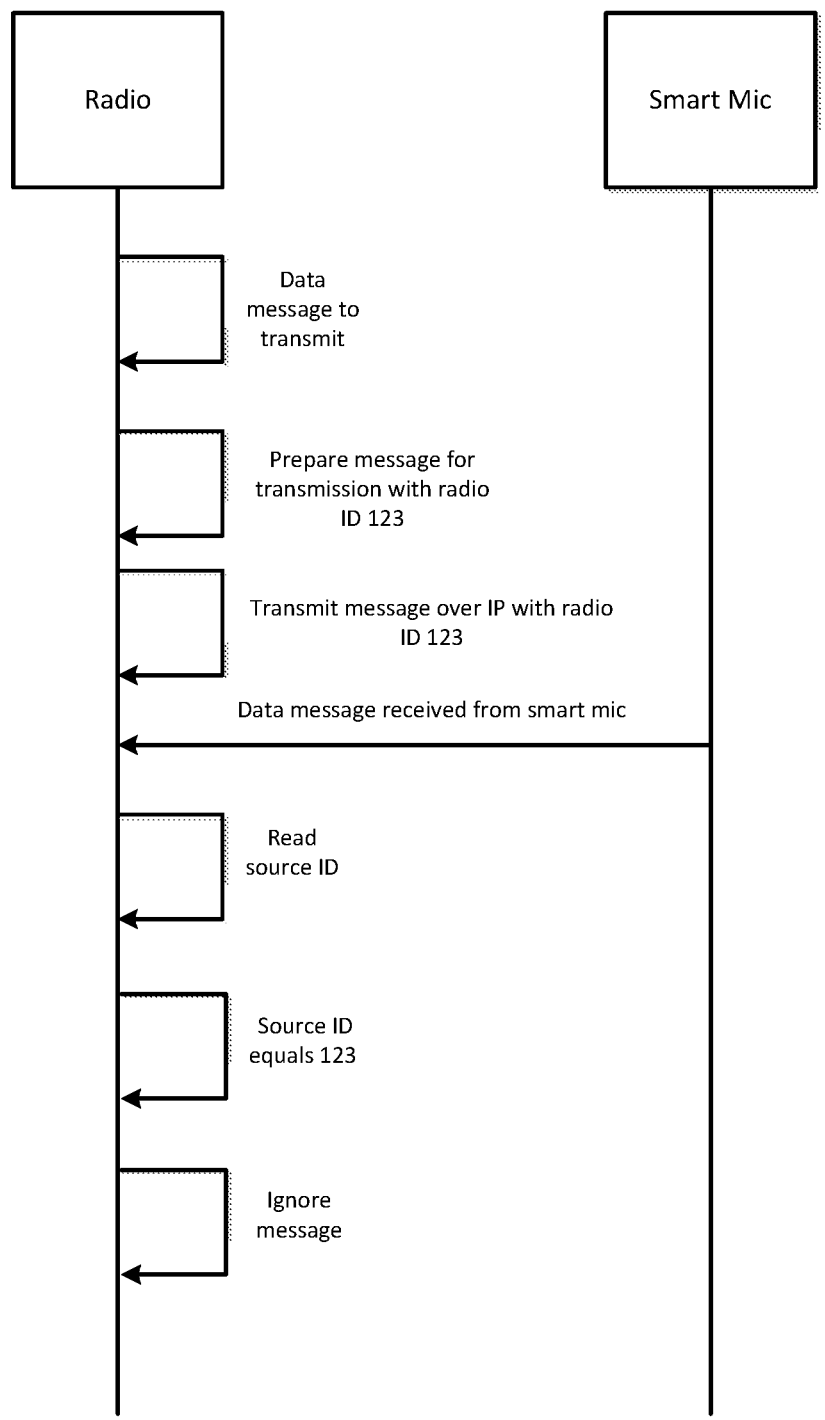
Figure 20:
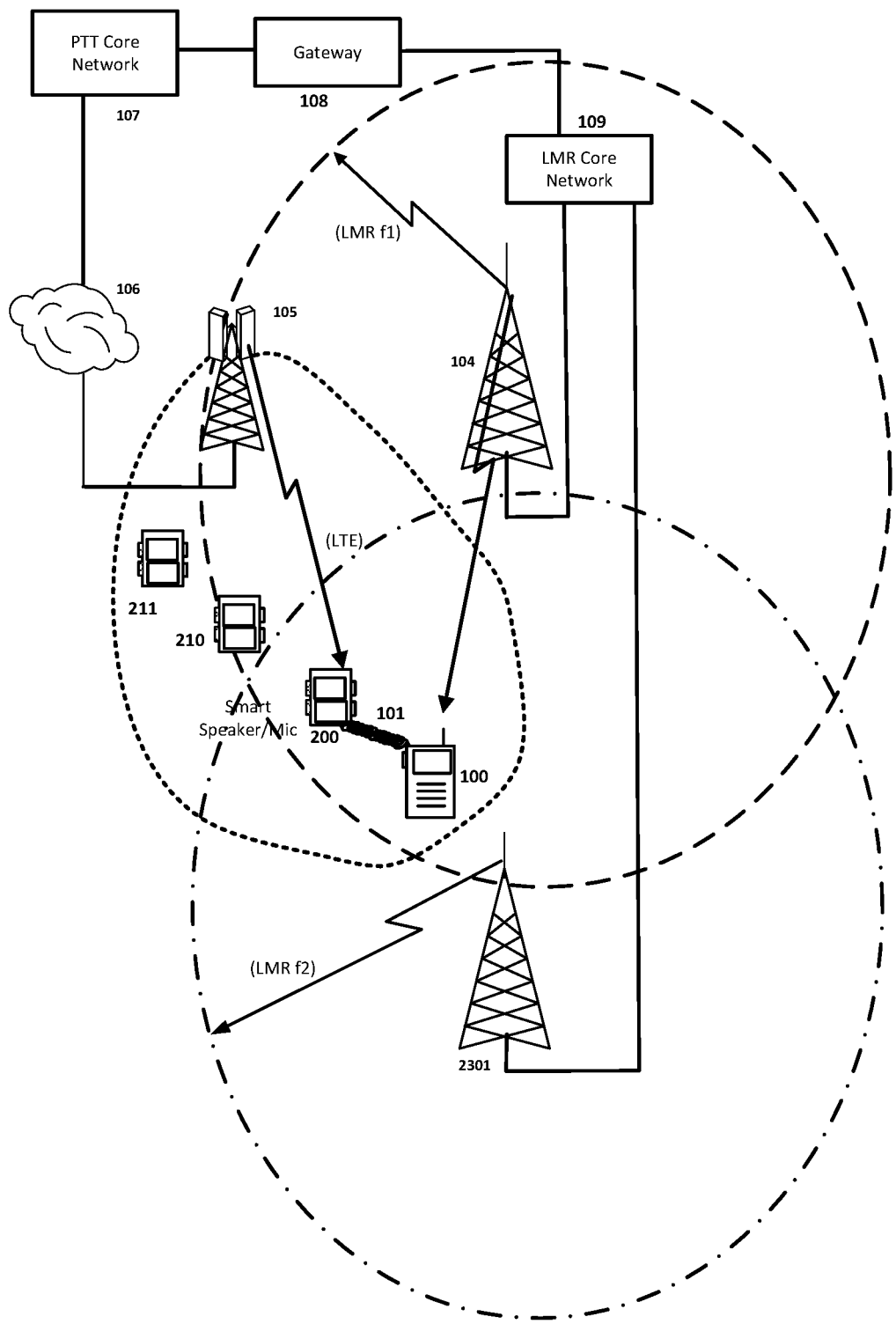
Figure 21:
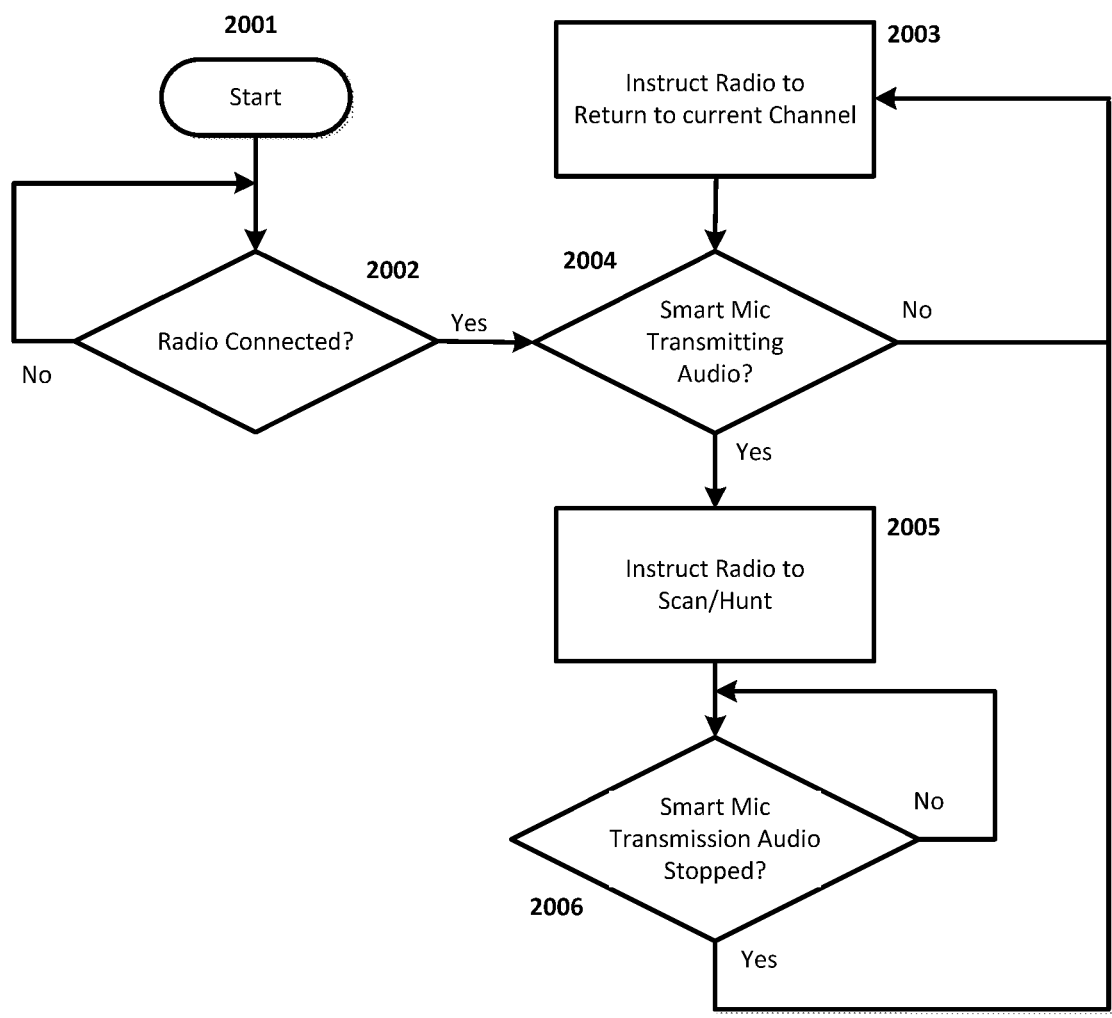
Figure 22:
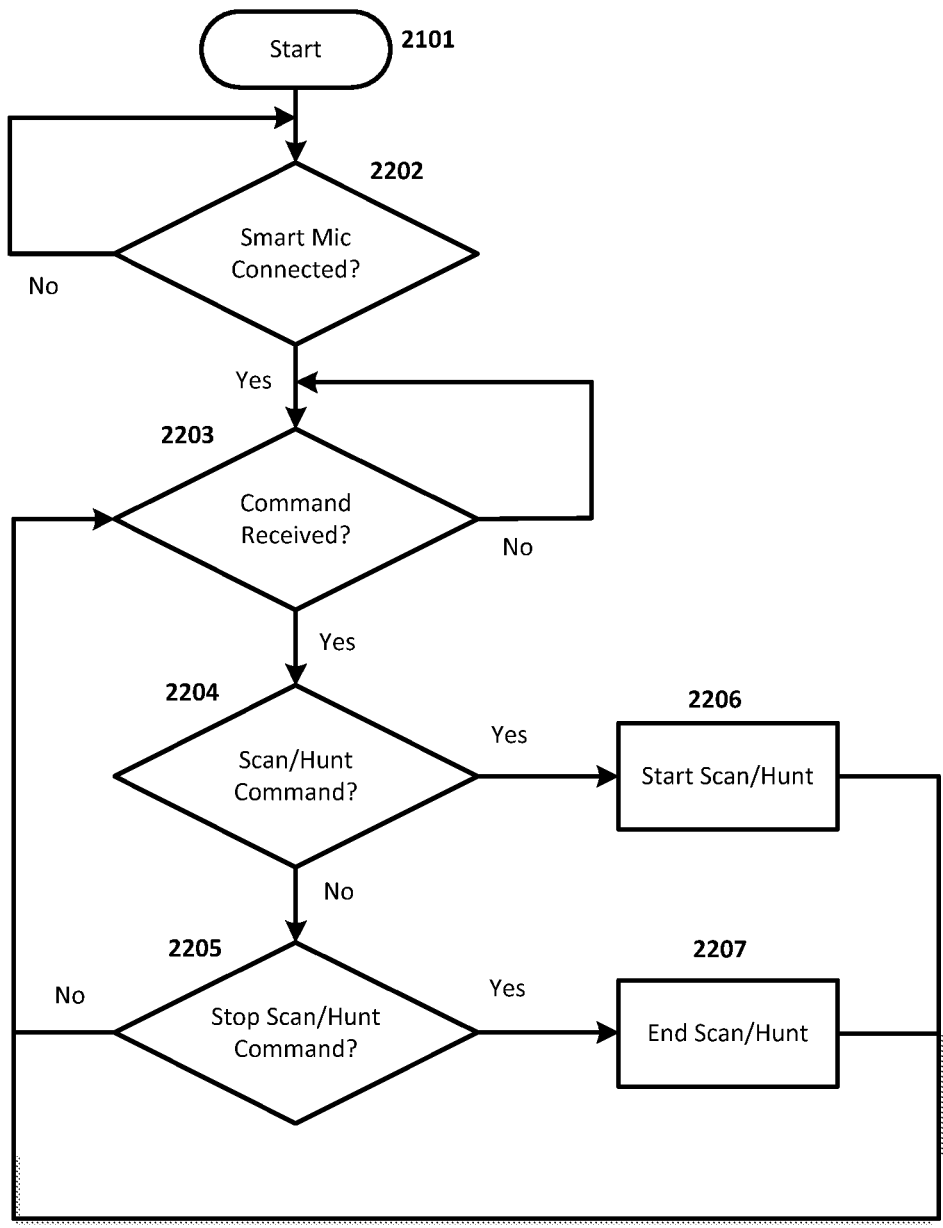
Figure 23:
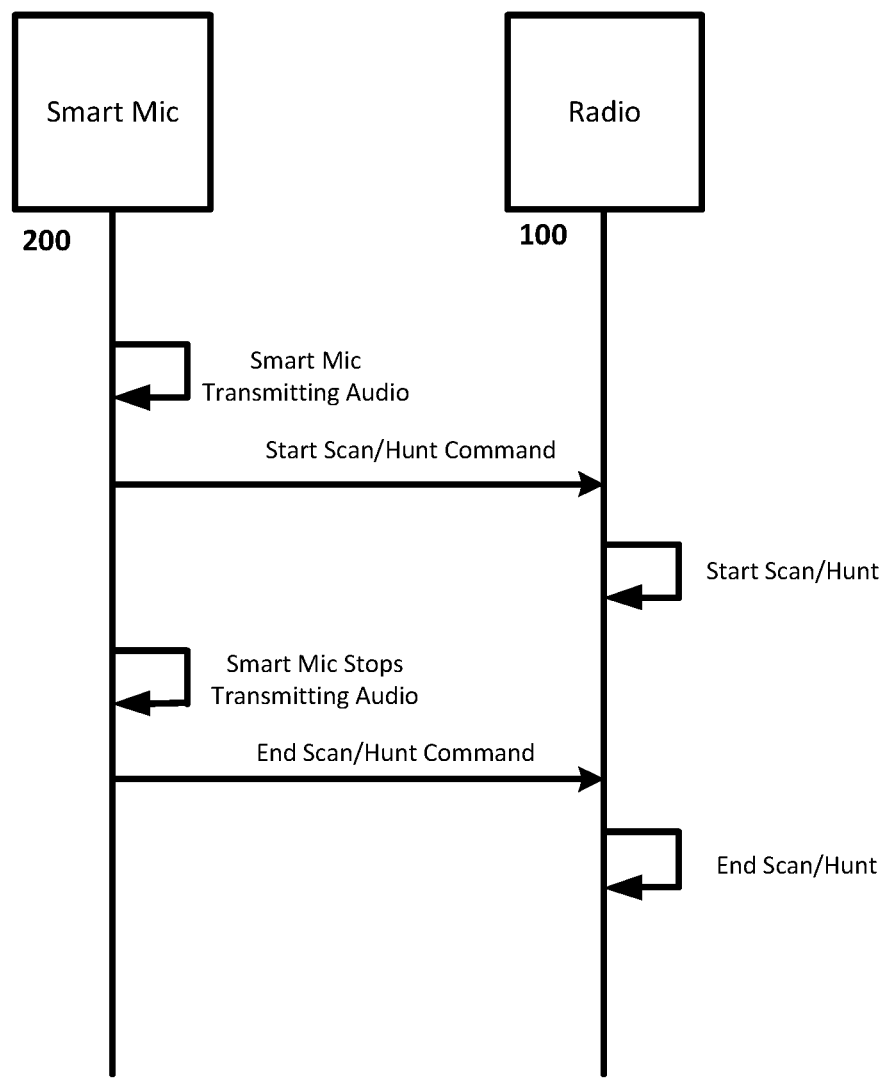

Preferred embodiments of the invention will be described with respect to the accompanying drawings, of which:

FIG. 1 shows a typical LMR radio terminal attached to a standard speaker/mic,

FIG. 2 shows a typical LMR radio terminal connected to a smart mic of the form described in this patent, FIG. 3 shows a typical smart mic operating independently of the LMR radio terminal, FIG. 4 shows a system overview of an LMR system operating with a cellular system, FIG. 5 shows and overview of the smart mic connected to an external radio terminal, FIG. 6 describes a typical LMR system, FIG. 7 shows a typical LMR system integrated with a PTT solution, FIG. 8 shows a flow diagram illustrating how the smart mic instructs an attached radio terminal to mute or unmute, FIG. 9 shows a flow diagram describing how an attached radio terminal responds to an instruction by the smart mic to mute or unmute, FIG. 10 shows a sequence diagram showing the process by which the instruction to mute or unmute is managed by the smart mic and the radio terminal, FIG. 11 shows a flow diagram illustrating how the radio terminal instructs the smart mic to mute or unmute, FIG. 12 shows a flow diagram describing how the smart mic responds to instruction by the radio terminal to mute or unmute, FIG. 13 shows a sequence diagram illustrating the process by which the instruction to mute or unmute is managed by the radio terminal and the smart mic, FIG. 14 shows a process for the transmission of a data message from the smart mic containing a smart mic ID, FIG. 15 shows a process on the smart mic for detecting the receipt of messages that it sent on the cellular path, FIG. 16 shows a sequence diagram for detecting messages originating from a smart mic and being received via an attached radio terminal, FIG. 17 shows a process for transmitting a message from a radio terminal with a radio terminal ID, FIG. 18 shows a process for detecting messages originating from a radio terminal and being received via a smart mic, FIG. 19 shows a sequence diagram for detecting messages originating from a radio terminal and being received via an attached smart mic, FIG. 20 shows a typical system where LMR scanning or hunting may be applied, FIG. 21 shows a smart mic algorithm for instructing the radio to scan/hunt while the smart mic is transmitting audio, FIG. 22 shows a radio algorithm for being instructed to scan/hunt while the smart mic is transmitting audio, FIG. 23 shows a sequence diagram for instructing the radio to scan/hunt while the smart mic is transmitting audio.

DESCRIPTION OF PREFERRED EMBODIMENTS

Referring to the drawings it will be appreciated the invention may be performed in a variety of ways using many forms of an LMR device such as a portable or mobile radio terminal combined with many forms of a cellular device such as a smart mic or a cellphone implementing a PTToC client. An outgoing user communication by either the mobile radio or the smart mic, for example, causes a corresponding incoming communication at the smart mic or the radio, to be suppressed. A process for suppressing voice or data at one or other device can be carried out in a number of ways.

FIG. 1 shows a typical configuration of an LMR radio terminal 100 connected to a standard speaker mic 102 through a cable 101. This is a common configuration used in the field today. For example a police officer may be wearing an LMR radio terminal 100 on a belt and a cable 101 may run up the body to a speaker mic 102 located on a lapel or another convenient position. The cable 101 typically carries audio signals and push to talk (PTT) signals. This type of speaker mic 102 typically has minimal processing capability and represents an extension of the microphone/speaker functionality of an attached LMR radio device.

FIG. 2 shows a cellular device in the form of a smart mic 200. The smart mic contains its own processor. The smart mic is optionally connected to an LMR radio terminal 100 via a cable 101 that may be the same as that described in FIG. 1. The smart mic 200 also contains one or more microphones 201 and one or more speakers 202 and one or more function buttons. In this case two PTT buttons are shown 204 and 205 and two other buttons 203 and 206 represent general function buttons such as report location or emergency button. All the buttons are configurable.

FIG. 3 shows a smart mic 200 in isolation to illustrate that this device can operate independently of the radio terminal device. Loaded on the smart mic is a VOIP application client. The application is configured such that one or more voice groups may exist (e.g one for local operations and one for dispatcher operations). Alternatively the application client can support individual calls such that one smart mic user can contact another smart mic user. This application client normally operates in full duplex voice mode meaning the users of this smart mic and of other smart mics can talk and listen at the same time.

FIG. 4 shows an overview of a combined LMR and LTE wireless communication system described herein. An LMR core network 109 is connected to one or more LMR communication towers 104 that radiate an LMR signal across the geographic area shown which serves several radio terminals including 102 and 103. FIG. 4 also shows a PTT Core network 107 which offers full duplex voice services though is also capable of automatically switching to half duplex. This connects to one or more cellular towers through an IP network 106. In this illustration it is assumed the cellular towers are LTE 105 although any cellular technology capable of supporting IP connectivity is sufficient. The LTE towers supply service within the geographic area shown and serve several smart mic devices including 210 and 211.

FIG. 4 also shows a voice gateway 108 between the PTT Core 107 and the LMR Core 109. Also shown is a smart mic 200 connected by a cable 101 to an LMR radio terminal 100. This particular smart mic unit 200 is capable of making calls over either LTE or radio terminal. LMR terminals 102 and 103 and 100 can communicate with each other using the LMR network. Smart mic units 200, 210 and 211 can communicate with each other using the LTE network. In the presence of the gateway 108 then all the devices 100, 102, 103, 200, 210 and 211 can communicate with each other. In the special case of smart mic 200 it can initiate a call on either the LTE network using one button or it can initiate a call on the LMR network using another button. Alternatively it can receive on either LTE or LMR (via the LMR radio terminal).

FIG. 5 offers a system description of a smart mic 200. The smart mic contains a control unit 500 which is a processor and that implements control and communication functions for the device. The control unit connects to a GPS unit 520 for the purpose of reading smart mic location. For convenience in this document the US technology is described which is GPS however all forms of Global Navigation Satellite System (GNSS) are included. The computer instructions that implement the algorithms on the platform are contained within local memory 501 and executed on the smart mic. The smart mic contains a cellular radio terminal 502 used for communicating over the cellular network. The cellular radio terminal 502 is connected to the control unit 500. The smart mic contains a Bluetooth and or Wi-Fi unit 503 used for communicating to local equipment over this medium. The Bluetooth and or Wi-Fi 503 are connected to the control unit 500.

The smart mic also contains one or more microphones 506 and one or more speakers 504 and one or more function buttons 508. These are preferentially connected to the control unit 500 via a switching control unit 507 and/or the audio subsystem 505. Audio subsystem processing may include adjusting audio levels, injecting audio and audio filtering. The smart mic also contains a local power source 510 that in this case is a battery. Also connected to the switching unit is an externally attached device 509 that in this case is an LMR radio terminal. This LMR radio terminal may be a handheld that operates from a battery. Alternatively the LMR radio terminal may be installed in a vehicle. In the LMR industry this device is typically referred to as a mobile radio terminal that operates from a vehicle power supply. In an alternative form the smart mic 200 may be physically built into a mobile radio terminal.

FIG. 6 offers an overview of the components in a typical trunked LMR system. Base station 603 represents a control channel, labelled RF Channel CC1 in a trunked system. Base stations 604 and 605 represent traffic channels, TCH1 and TCH2 that can be allocated using CC1 offered on base station 603. It is typical for a physical site to be managed by a site controller 601. A second site is also shown controlled by site controller 602 which in turn controllers control channel 606 and traffic channels 607 and 608. Each site controller is connected to a LMR trunked controller referred to in P25 as a Radio Frequency Sub System Controller (RFSS Controller). The P25 RFSS Controller 107 is the central point of control in the network.

FIG. 7 describes an overall LMR and cellular communication architecture with a combined LMR/cellular user system according to an embodiment of the invention. Components 107 and 601 to 608 form a physical P25 network made up of a P25 RFSS controller 107 and two site controllers 601 and 602 and several base stations 603 to 608 making up two control channels and four traffic channels. The RFSS 107 is connected to a voice gateway 108 for a PTT Core network 109 which offers VOIP services. The PTT Core Network 109 communicates with smart devices via an IP network which in this case is a cellular network 620. Also shown in this figure is the smart mic 200 connected via a cable 101 to an LMR terminal which can operate on the LMR network controlled by the RFSS 107. The combined smart mic and LMR terminal are typically carried by a user on shoulder clips or belt clips for example.

FIG. 8 illustrates the process by which the smart mic instructs the attached radio terminal to mute when the smart mic is transmitting. In step 802, the smart mic detects whether or not a radio terminal is attached. If a radio terminal is not attached then the smart mic simply remains in step 802 until a radio terminal is attached. If a radio terminal is attached then in step 804 an assessment is made to see if the smart mic is transmitting audio via the PTToC path. If a PTToC transmission has started then in step 805 an instruction is sent to the radio terminal informing it to mute its received audio on that channel. On that channel includes mute the audio if the radio terminal is operating on the same group as the smart mic. In step 806 a test is conducted to see if the smart mic is still transmitting audio. If it is then the system forces a return to step 806 until such time as the transmission ceases. If in step 806 the transmission ceases then in step 803 a message is sent to the radio terminal instructing it to unmute the received audio whereupon in step 804 the system begins waiting for another smart mic transmission of PTToC.

FIG. 9 describes a process in the radio terminal for reacting to the messages from the smart mic. In step 902 a test is conducted to see if a smart mic is connected. If a smart mic is not connected then the system remains in step 902. If a smart mic is connected then in step 903 a test is conducted to see if a command is received from the smart mic. If no command is received then the radio terminal remains in step 903. If a command is received then it could be a mute or unmute command. In step 904 a check is made to see if a mute command has been received. If a mute command has been received then in step 906 the received audio for that channel is muted. On that channel means if the radio terminal is operating on the same talk group as the smart mic. Once this command is processed the radio terminal returns to step 903 to wait for another command. If in step 904 the received command was not a mute command then in step 905 a test is conducted to see whether an unmute command is received. If an unmute command has been received then in step 907 the radio terminal unmutes for that channel. On that channel means if the radio terminal is operating on the same talk group as the smart mic. Once this command is processed the radio terminal returns to step 903 to wait for another command. If in step 905 an unmute command has not been received then it means the command received was not recognised hence the system returns to step 903 to wait for another command.

FIG. 10 illustrates a sequence showing a scenario in which the smart mic begins transmitting and instructs the radio terminal to mute its received audio. The smart mic begins transmitting and sends a Mute Radio Audio command to the radio terminal. Upon receiving this message the radio terminal mutes its audio on that particular channel. Sometime later the smart mic ceases its transmission whereupon the smart mic sends an unmute radio audio command to the radio terminal. The radio terminal unmutes audio on that channel.

FIG. 11 illustrates the process by which the radio terminal instructs the attached smart mic to mute when the radio terminal is transmitting audio. In step 1102, the radio terminal detects whether or not a smart mic is attached. If a smart mic is not attached then it simply remains in step 1102 until a smart mic is attached. If a smart mic is attached then in step 1104 an assessment is made to see if the radio terminal is transmitting audio via the LMR path. If an LMR transmission has started then in step 1105 an instruction is sent to the smart mic informing it to mute its received audio on that channel. In an alternative form, the smart mic may detect the radio terminal is transmitting and mute itself. On that channel includes mute the audio if the smart mic is operating on the same group as the radio terminal. In step 1106 a test is conducted to see if the radio terminal is still transmitting audio. If it is then the process returns to step 1106 until such time as the transmission ceases. If in step 1106 the transmission ceases then in step 1103 a message is sent to the smart mic instructing it to unmute the received audio (in an alternative form the smart mic may detect the radio terminal has stopped transmitting and unmute itself) whereupon in step 1104 the system begins waiting for another radio transmission of LMR.

FIG. 12 describes a process in the smart mic for reacting to the messages from the radio terminal. In step 1102 a test is conducted to see if a radio terminal is connected. If it is not then the system remains in step 1102. If a radio terminal is attached then in step 1103 a test is conducted to see if a command is received from the radio terminal. If no command is received then the smart mic remains in step 1103. If a command is received then it could be a mute or unmute command. In step 1104 a check is made to see if a mute command has been received. If a mute command has been received then in step 106 the received audio for that channel is muted. On that channel includes if the smart mic is operating on the same talk group as the radio terminal. Once this command is processed the smart mic returns to step 103 to wait for another command. If in step 1104 the received command was not a mute command then in step 1105 a test is conducted to see if an unmute command is received. If an unmute command has been received then in step 1107 the smart mic unmutes audio for that channel. On that channel includes if the smart mic is operating on the same talk group as the radio terminal. Once this command is processed the smart mic returns to step 103 to wait for another command. If in step 1105 an unmute command has not been received then it means the command received was not recognised hence the system returns to step 1103 to wait for another command.

FIG. 13 illustrates a sequence showing a scenario in which the radio terminal begins transmitting and instructs the smart mic to mute its received audio. The radio terminal begins transmitting and sends a mute smart mic audio command to the smart mic. Upon receiving this message the smart mic mutes its audio on that particular channel. Sometime later the radio terminal ceases its transmission whereupon the radio terminal sends an unmute smart mic audio command to the smart mic. The smart mic unmutes audio on that channel.

FIG. 14 shows a process that the smart mic undertakes when it has data to transmit. In step 1402 a check is made to assess if the smart mic has data to transmit. If it has not then the system remains in step 1402. If there is data to transmit then a data packet is created which included the ID of the smart mic (in this example the smart mic ID is 1407). This packet is then transmitted in step 1404 whereupon the smart mic returns to step 1402 to wait another data message to transmit.

FIG. 15 illustrates the process by which the smart mic detects if it has received messages originating from itself but arriving at the smart mic via the attached radio terminal. In step 1502 a check is made is to see if a data packet has arrived from the attached radio terminal. If nothing has arrived then the system continues waiting in step 1502. If a data packet has arrived then in step 1503 the source ID is read from the data packet. In step 1504 a check is made to see if the source ID is the same as the smart mic running this algorithm. If the smart mic ID extracted from the packet is the same as the smart mic running this algorithm (in this example 1407) then the message is ignored in step 1505 and the system returns to step 1502 to await another data packet arriving. If the source ID received is not the same as the smart mic running this algorithm (in this example that means not 1407) then the message must have originated from another smart mic in which case it is processed as normal.

FIG. 16 illustrates a sequence showing a scenario in which the smart mic is transmitting data and ignores data it receives from the attached radio terminal. The smart mic is in the process of transmitting data using the smart mic ID. The smart mic receives an indication from the attached radio terminal 100 with a message that has arrived over the radio path. The smart mic reads the source ID of the data from the radio terminal and if it is the same as that of the smart mic itself then the smart mic ignores the data. If it is different from that of the smart mic then the smart mic processes the data.

FIG. 17 shows a process that the radio terminal undertakes when it has data to transmit. In step 1702 a check is made to assess if the radio terminal has data to transmit. If it has not then the system remains in step 1702. If there is data to transmit then a data packet is created which included the ID of the radio terminal (in this example the smart mic ID is 123). This packet is then transmitted in step 1704 over the LMR path whereupon the radio terminal returns to step 1702 to await another data message to transmit.

FIG. 18 illustrates the process by which the radio terminal detects if it has received messages originating from itself but arriving at the radio terminal via the attached smart mic. In step 1802 a check is made to see if a data packet has arrived from the attached smart mic. If nothing has arrived then the system continues waiting in step 1802. If a data packet has arrived then in step 1803 the source ID is read from the data packet. In step 1804 a check is made to see if the source ID is the same as the radio terminal running this algorithm. If the radio terminal ID extracted from the data packet is the same as the radio terminal running this algorithm (in this example 123) then the message is ignored in step 1805 and the system returns to step 1802 to await another data packet arriving. If the source ID received is not the same as the radio terminal running this algorithm (in this example that means not 123) then the message must have originated from another radio terminal in which case it is processed as normal. In an alternative form, the smart mic may ready the ID of the attached radio terminal and implement the flow diagram shown in FIG. 18 within the smart mic resulting in the duplicate data message being ignored with the need to send it to the radio terminal.

FIG. 19 illustrates a sequence showing a scenario in which the radio terminal is transmitting data and ignores data it receives from the attached smart mic. The radio terminal is in the process of transmitting data and receives a request to receive data originating from identifiable smart mics. The radio terminal reads the source ID of the data from the smart mic and if it is the same as that of the radio terminal then the radio terminal ignores the data and if it is different from that of the radio terminal then the radio terminal processes the data.

FIG. 20 expands upon the system description given in FIG. 4. Two LMR communications towers 104 transmitting on frequency f1 over a first geographic area and 2301 and transmitting on f2 over a second geographic area. The first communications tower 104 includes a site controller 601, a control channel 603 and a number of traffic channels 604 and 605 as shown in FIG. 7. The second communications tower 2301 includes a site controller 601, a control channel 606 and a number of traffic channels 607 and 608 as shown in FIG. 7. When the radio 100 moves between the coverage area of tower 104 and 2301 it can scan/hunt between the two control channels 603 and 606 and choose the best one based on signal strength. This is a typical operation of an LMR terminal as known in the art. In this case however the radio 100 is connected to a smart mic 200 which means that if the user is presently using the smart mic it means the radio can preferentially hunt/scan without interrupting user operation. Here is described the case of measuring the control channels 603 and 606 to make a decision as to which tower 104 and 2301 to connect to. The same approach can be used to select between voice channels.

FIG. 21 illustrates the process by which the smart mic instructs the attached radio terminal to scan/hunt when the smart mic is transmitting. In step 2002, the smart mic detects whether or not a radio terminal is attached. If a radio terminal is not attached then the smart mic simply remains in step 2002 until a radio terminal is attached. If a radio terminal is attached then in step 2004 an assessment is made to see if the smart mic is transmitting audio via the PTToC path. If a PTToC transmission has started then in step 2005 an instruction is sent to the radio terminal informing it to start scanning/hunting on the set of channels available, in this case f1 and f2. In step 2006 a test is conducted to see if the smart mic is still transmitting audio. If it is then the system forces a return to step 2006 until such time as the transmission ceases. If in step 2006 the transmission ceases then in step 2003 a message is sent to the radio terminal instructing it to stop scanning/hunting whereupon in step 2004 the system begins waiting for another smart mic transmission of PTToC.

FIG. 22 describes a process in the radio terminal for reacting to the messages from the smart mic. In step 2202 a test is conducted to see if a smart mic is connected. If a smart mic is not connected then the system remains in step 2202. If a smart mic is connected then in step 2203 a test is conducted to see if a command is received from the smart mic. If no command is received then the radio terminal remains in step 2203. If a command is received then it could be a scan/hunt or stop scan/hunt command. In step 2204 a check is made to see if a start scan/hunt command has been received. If a scan/hunt command has been received then in step 2206 the LMR terminal begins a scan/hunt. Once this command is processed the radio terminal returns to step 2203 to wait for another command. If in step 2204 the received command was not start scan/hunt then in step 2205 a test is conducted to see whether a stop scan/hunt command is received. If a stop scan/hunt command has been received then in step 2207 the radio terminal ceases the current scan/hunt. Once this command is processed the radio terminal returns to step 2203 to wait for another command. If in step 2205 a stop scan/hunt command has not been received then it means the command received was not recognised hence the system returns to step 2203 to wait for another command.

FIG. 23 illustrates a sequence showing a scenario in which the smart mic begins transmitting and instructs the radio terminal to start a scan/hunt. The smart mic begins transmitting and sends a scan/hunt command to the radio terminal. Upon receiving this message the radio terminal moves off the present channel and starts a scan/hunt Sometime later the smart mic ceases its transmission whereupon the smart mic sends a stop scan/hunt command to the radio terminal. The radio terminal ceases the present scan/hunt and returns to the existing channel.

The invention claimed is:

1. A combined LMR/cellular system for user communication comprising:
an LMR terminal having a wired or wireless connection to a smart mic,
wherein the wired or wireless connection is used for an outgoing user communication by the LMR terminal or the smart mic;
wherein the outgoing user communication by the LMR terminal causes a corresponding incoming communication received at the smart mic to be suppressed, and
wherein the outgoing user communication by the smart mic causes any corresponding incoming communication received at the LMR terminal to be suppressed.

2. The system according to claim 1, wherein the outgoing user communication by the LMR terminal or the smart mic is a voice call over the LMR terminal or the smart mic, and wherein the corresponding incoming communication is suppressed by muting the call at the smart mic or at the LMR terminal.

3. The system according to claim 1, wherein the outgoing user communication by the LMR terminal or the smart mic is a data message from the LMR terminal or the smart mic, and wherein the corresponding incoming communication is suppressed by ignoring the message at the smart mic or at the LMR terminal.

4. The system according to claim 1, wherein the outgoing user communication by the LMR terminal or the smart mic is a voice call, or a data message from the smart mic, and wherein the corresponding incoming communication is suppressed by causing the LMR terminal to switch to a scan or hunt mode.

5. The system according to claim 1, wherein the outgoing user communication by the LMR terminal or the smart mic is a voice call, or a data message from the smart mic, and wherein the corresponding incoming communication is suppressed by causing the LMR terminal to change a channel.

6. The system according to claim 1, wherein the outgoing user communication by the LMR terminal or the smart mic is either a half duplex communication by the LMR terminal, or a half or full duplex cellular communication by the smart mic.

7. A method of operating a combined LMR/PTToC system for a user communication comprising:
transmitting an outgoing user communication at an LMR terminal of the system,
suppressing a corresponding incoming communication at the PTToC client of the system,
transmitting an outgoing user communication at a PTToC client, and
suppressing a corresponding incoming communication at the LMR terminal of the system.

8. The method according to claim 7, wherein suppressing the corresponding incoming communication comprises muting either the PTToC client or the LMR terminal.

9. The method according to claim 7, wherein suppressing the corresponding incoming communication comprises ignoring a data message at either the PTToC client or the LMR terminal.

10. The method according to claim 7, wherein suppressing the corresponding incoming communication at the LMR terminal comprises altering an operation of the LMR terminal to a scan or hunt mode.

11. The method according to claim 7, wherein suppressing the corresponding incoming communication at the LMR terminal comprises changing a channel at the LMR terminal.

12. The method according to claim 7, wherein the outgoing user communication is either a half duplex communication by the LMR terminal, or a half or full duplex communication by the PTToC client.

13. A cellular device for a combined LMR radio and cellular user communication system, comprising:
a processor and a memory containing instructions for the processor;
wherein, during an outgoing user communication by the combined system, the instructions cause the processor to:
determine that the cellular device is connected to the radio,
determine that the cellular device is transmitting audio or data to another user over a cellular bearer, and
instruct the radio to suppress a corresponding incoming communication received by the radio over an LMR bearer.

14. The device according to claim 13, wherein the instructions cause the radio to suppress the corresponding incoming communication by muting a voice call, ignoring a data message, entering a scan or hunt mode, or changing an LMR channel.

15. The device according to claim 13, wherein the device is a smart mic or a cellphone containing a PTToC client.

* * * * *